Figure 1:
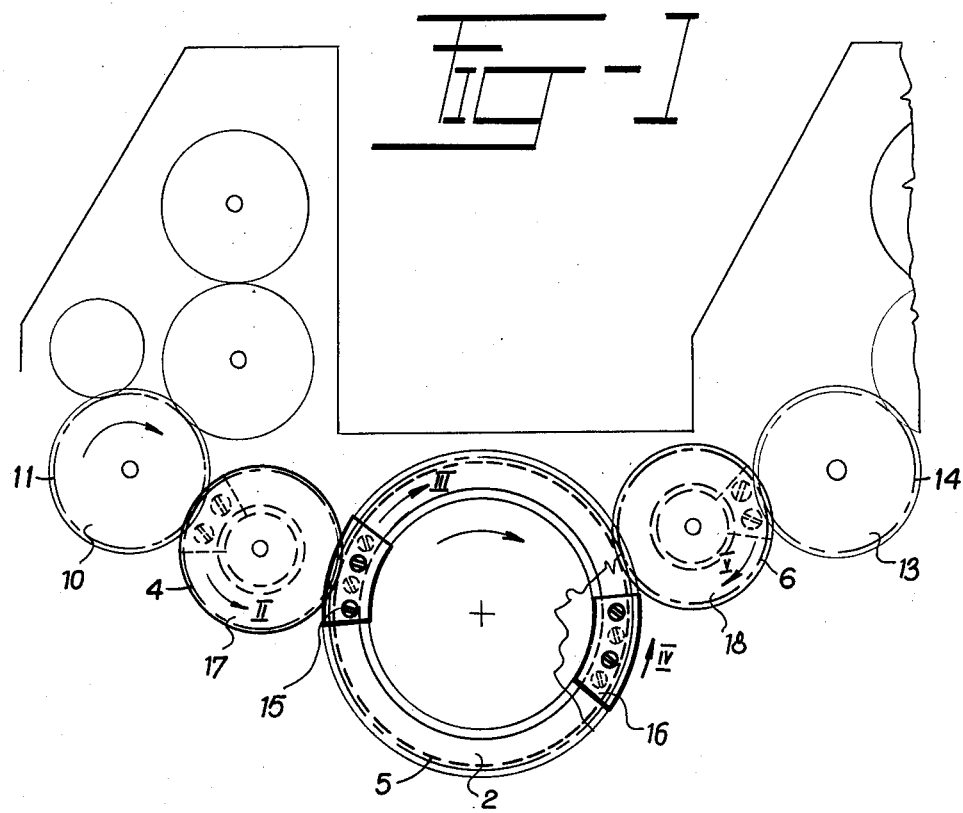

United States Patent [19]

Cerny et al.

[11] 4,241,619
[45] Dec. 30, 1980

[54] DEVICE FOR TAKING UP THE CLEARANCE OF GEAR TRANSMISSIONS

[75] Inventors: Arnost Cerny, Blansko; Jaroslav Janecek, Brno, both of Czechoslovakia

[73] Assignee: Adamovske Strojirny, Narodni Podnik, Adamov, Czechoslovakia

[21] Appl. No.: 896,227

[22] Filed: Apr. 25, 1978

[30] Foreign Application Priority Data

Apr. 13, 1977 [CS] Czechoslovakia ............... 2401-77

[51] Int. Cl.³ ............................................. F16H 55/18
[52] U.S. Cl. ........................................ 74/440; 74/409; 74/448; 101/248
[58] Field of Search .................... 74/409, 440, 448; 101/248

[56] References Cited

U.S. PATENT DOCUMENTS

| | | | |
|---|---|---|---|
| 3,037,396 | 6/1962 | Martin | 101/248 X |
| 3,407,727 | 10/1968 | Fischer | 101/248 X |
| 3,477,370 | 11/1969 | Fischer | 74/440 |
| 3,496,865 | 2/1970 | Fischer | 101/248 X |
| 3,556,006 | 1/1971 | Papa | 74/440 X |

OTHER PUBLICATIONS

Product Engineering Magazine, Oct. 26, 1959, Article "18 Ways to Control Backlash in Gearing", pp. 71-75.

*Primary Examiner*—C. J. Husar
*Assistant Examiner*—Conrad Berman
*Attorney, Agent, or Firm*—Burgess, Ryan and Wayne

[57] ABSTRACT

A technique for correcting backlash in gears utilized in printing machines. The backlash is corrected by means of toothed segments, i.e. sections of a gear, with each segment having gear teeth of varying width, with the teeth at the center of the segment having greatest width and the width of successive teeth decreasing by 0.005 to 0.6 mm to minimum values at both ends of the segment. Each segment is positioned so that the gear teeth of proper diameter to reduce backlash are disposed next to the teeth of the gear on which the segment is mounted.

2 Claims, 5 Drawing Figures

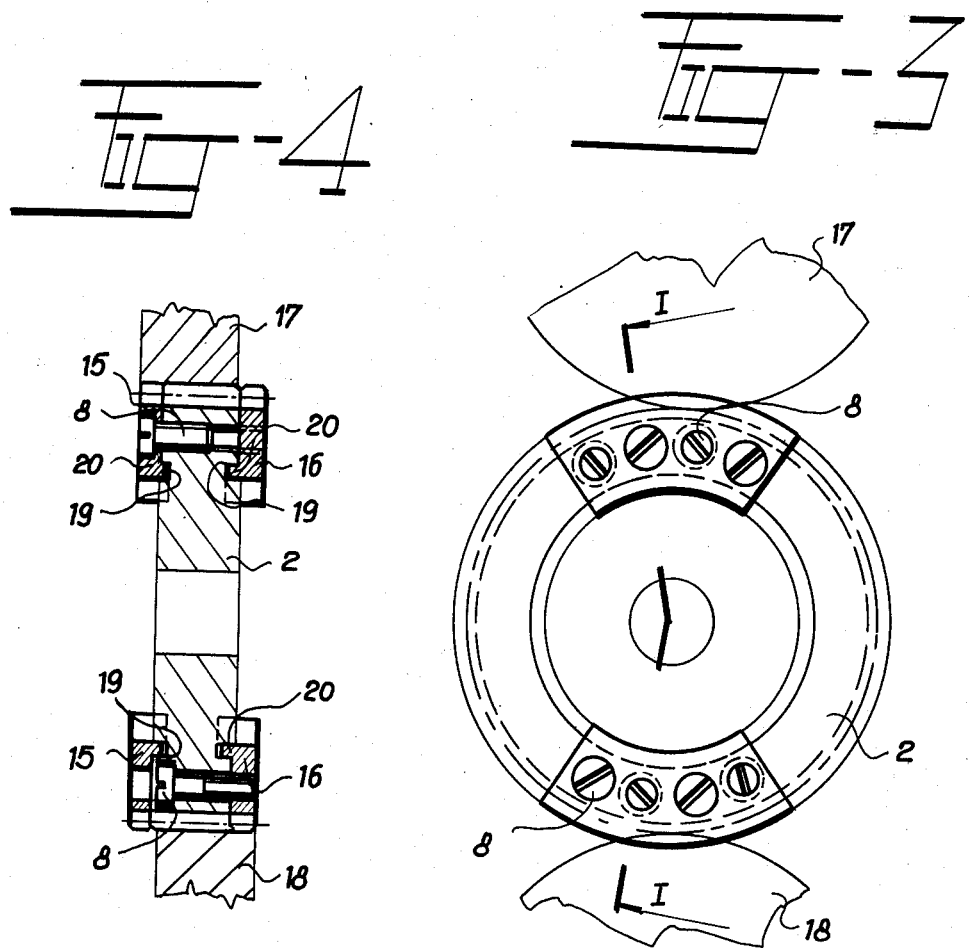
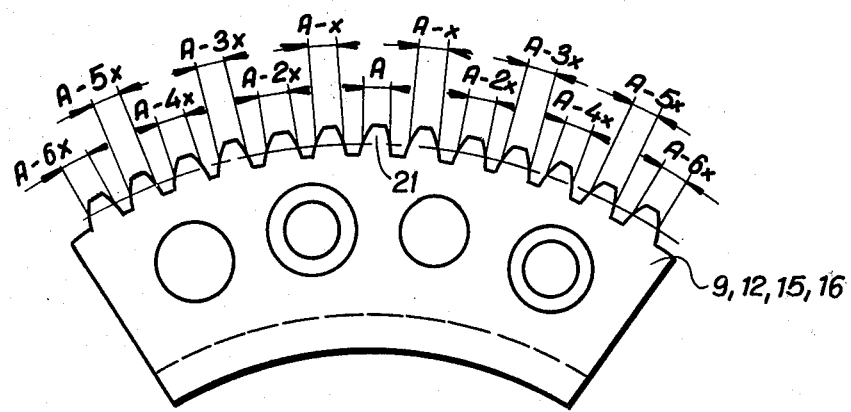

DEVICE FOR TAKING UP THE CLEARANCE OF GEAR TRANSMISSIONS

The present invention relates to a device for taking up the clearance of gear transmissions, particularly the clearance between the gears of impression cylinders and transfer cylinders of printing machines.

An important condition for the obtaining of a perfect register in printing on paper sheets which are transferred on a multicolor printing press from one printing unit to the following printing units, is to secure an accurate position of the transferred sheets in the pregrippers, on the impression cylinders and on the transfer cylinders.

On a known multicolor printing machine, paper sheets to be printed are transported from one printing unit to the other by means of chains which are provided with grippers. The accurate positioning of the sheet relative to the impression cylinder is secured by means of guide pins which are mounted on the gripper mechanism, and by means of a stop element which is arranged on the impression cylinder.

A disadvantage of this device is that it is not possible to transfer paper sheets by means of the gripper mechanism mounted on chains without use of complex auxiliary equipment where printing on both sides of the sheet with one pass of the sheet through the printing machine is required.

Therefore, on multicolor printing machines, transfer drums are used for the transfer of paper sheets from one printing unit to the following printing unit of the machine. Transfer drums permit the transfer of sheets at high printing speeds.

By use of transfer drums, if they are properly adjusted, it also is possible to turn the sheets of paper. On these printing machines, the transfer drums are driven by chains from one power source.

As a result of clearance or backlash between the teeth of the drive gears, a vibration in the gear mechanism and of the transfer cylinders (drums) is produced, which has a very negative effect on the printing quality.

Known means for the taking up of clearance or backlash between gears are clearance eliminating gears or toothed segments which have teeth of the same width as the teeth, the clearance of which has to be eliminated. The clearance eliminating gears and toothed segments are (turnably) mounted on drive gears and are urged by means of springs between (into) the teeth of the engaging gear, by which the clearance is taken up.

A disadvantage of the mentioned device is in that due to production tolerances of the engaging gear, there is created during rotation of the machine, a turning of the gear for taking up clearance relative to the drive gear, which results in a considerable wear of the teeth of said gears. A further disadvantage is in that the mechanism of such a device is very expensive in production.

A disadvantage of devices with toothed segments is in that at the region of engagement of the spring-urged toothed segments with the drive gears undesirable shocks arise. The intensity of the shocks depends on the turning ratio of the toothed segments relative to the drive gears.

The above-mentioned disadvantages are avoided by a device according to the invention, where on the drive gears are attached toothed segments, the teeth of which have a different width, whereby the single teeth are stepwise with a reduced width in the direction from the center part of the toothed segment in the direction to the outer two end portions of the segment, the reduction of the teeth being gradual and with each given tooth the reduction of width always of the same value in a range of 0.005 to 0.06 mm.

The toothed segments are provided with centering arches which engage with centering recesses provided on the side walls of the drive gears. The toothed segments are fixed on the side walls of the drive gears by means of screws.

An advantage of the device, according to the present invention, is in that by a stepwise taking up of the clearance of the transmission gears of the printing cylinders in relation to the gears of the transfer drums, undesirable shocks which arise during the transfer of the paper sheets from the gripper mechanism of one transfer drum to the gripper mechanisms of the second transfer drum are eliminated. In eliminating these shocks in the printing mechanisms, the printing quality is considerably increased and also the life time of the printing machine.

Figure 2:
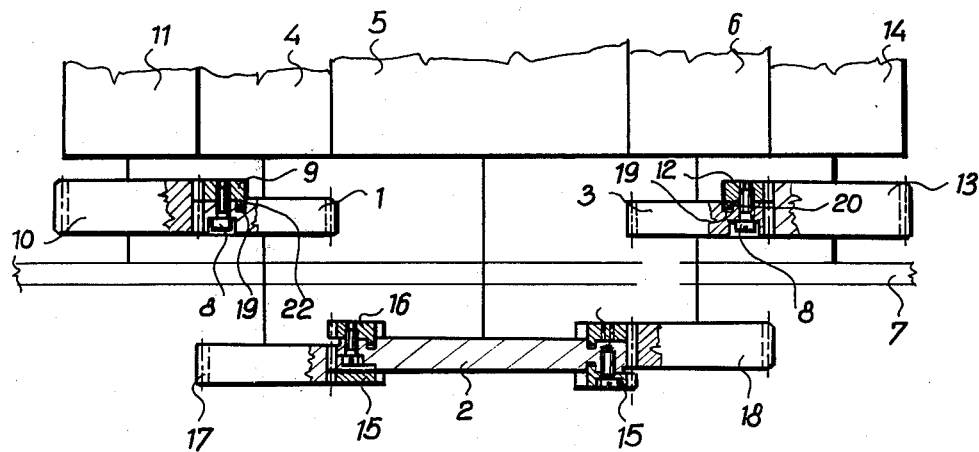

The invention will now be described in detail with reference to preferred embodiments thereof and to the illustrations on the accompanying drawings, wherein:

FIG. 1 shows schematically an arrangement of the printing cylinders and transfer drums of the printing machine, with the toothed segments which are fixed to the gears, FIG. 2 is a top view of the device of FIG. 1, FIG. 3 is a detailed view of the attachment of the toothed segments on the drive gear of the second transfer drum, FIG. 4 is a sectional view along a plane I—I of the device of FIG. 3; and FIG. 5 shows a detail of a toothed segment where the teeth have a different width, where the reduction of the width of teeth is beginning from the middle part of the segment and is increasing in the direction to the both end portions of the segment.

The device, according to the invention, consists of a first drive gear 1 which is mounted on the shaft of a first transfer drum 4. On the side wall of the first drive gear 1 is fixed by means of a screw 8, a toothed segment 9 which engages with a gear 10 fixed on the shaft of a first impression cylinder 11. A second drive gear 2 is mounted on the shaft of a second transfer drum 5 which has double the diameter of the first transfer drum 4 and a greater diameter than that of a third transfer drum 6.

On the outer side wall of the second drive gear 2, there are fixed two outer gear segments 15, one located opposite the other, which are in engagement with a gear 17 of the first transfer drum 4. On the inner side wall of the second drive gear 2, there are oppositely mounted two inner gear segments 16 which are in engagement with a gear 18 which is fixed on the shaft of the third transfer drum 6. On the shaft of the third transfer drum 6 also is fixed a third drive gear 3, on which is mounted a second gear segment 12 which engages a gear 13 fixed on the shaft of a second impression cylinder 14.

On the drive gears 1, 2, 3 are provided centering recesses 19, into which engage centering arches 20 which are formed on the gear segments 9, 12, 15 and 16. The gear segments 9, 12, 15, 16 are fixed on the side walls of the drive gears 1, 2, 3 by means of screws 8. Each tooth of the toothed segments 9, 12, 15 and 16 has a different width "A", whereby the teeth of the segments show gradually a reduction of width of a value "x" in the direction of the segments, whereby the value of reduction "x" is in the range of 0.003 to 0.06 mm.

The impression cylinders 11, 14 and transfer drums 4, 5 and 6 are rotationally mounted in side walls 7 of the printing machine.

The operation of the device according to the present invention is as follows:

After the first transfer drum 4 is turned relative to the first impression cylinder 11 to reach a position such that the gripper mechanisms, not illustrated, are in a position approximately on the direct line connecting the centers of the transfer drum 4 and the first impression cylinder 11, the proper circumferential adjustment of the first gear segment 9 is carried out. The centering arch 20 of the first gear segment 9 is turned in the centering recess 19 of the first drive gear 1 in the direction of arrow "II" in such a way, that the middle tooth 21 will completely take up the clearance between the first drive gear 1 and the gear 10 of the first impression cylinder 11. The position of the first gear segment 9 on the first drive gear 1 is then secured by means of the screws 8.

The take-up of clearance between the second drive gear 2 and the gear 17 of the first transfer drum 4 is achieved by turning the outer toothed segments 15. Each of the outer toothed segments 15 has to be individually turned, on the second drive gear 2 in the range of the tooth clearance, in the direction of arrow III. The take-up of clearance of teeth between the second drive gear 2 and the gear 18 of the third transfer drum 6 is carried out by turning of the inner gear segments 16 which are mounted on the second drive gear 2.

The circumferential adjustment of the inner gear segments 16 is carried out in the direction of arrow IV in the range of the clearance between the teeth. The position of the outer toothed segments 15 and of the inner toothed segments 16 is secured by the screws 8.

The take-up of clearance between the third drive gear 3 and the gear 13 of the second impression cylinder 14 is carried out by a circumferential turning of the second toothed segment 12 in the range of the clearance between the teeth, in the direction of arrow "V".

List of Reference Numerals of Parts

1—first drive gear
2—second drive gear
3—third drive gear
4—first transfer drum
5—second transfer drum
6—third transfer drum
7—side wall
8—screw
9—first toothed segment
10—gear of the first impression cylinder
11—first impression cylinder
12—second toothed segment
13—gear of the second impression cylinder
14—second impression cylinder
15—outer toothed segment
16—inner toothed segment
17—gear of the first transfer drum
18—gear of the third transfer drum
19—centring recess
20—centring arch
21—middle tooth

What is claimed is:

1. A device for taking up backlash between teeth of intermeshing gears comprising at least one arcuate toothed segment, the teeth of which are dimensioned close to those of said gears, said segment teeth having different widths with a reduction of the width of the individual teeth of the segment in the direction from the center part of the segment to the outer portions thereof on both sides, the reduction of the segment tooth width between adjacent teeth having a value in the range of 0.005 to 0.06 mm., and means for securing said segment adjacent one gear so that at least one of the segment teeth aligns with a tooth of said one gear and intermeshes with another of said gears.

2. The device according to claim 1, wherein each toothed segment is provided with centering arches which engage centering recesses formed in the side walls of an aligned one of said gears, each said toothed segment being affixed to the side wall of the aligned gear.

* * * * *